(12) United States Patent
Falck-Schmidt

(10) Patent No.: US 11,408,193 B2
(45) Date of Patent: Aug. 9, 2022

(54) TELESCOPIC MAST

(71) Applicant: Jan Falck-Schmidt, Odense C (DK)

(72) Inventor: Jan Falck-Schmidt, Odense C (DK)

( * ) Notice: Subject to any disclaimer, the term of this patent is extended or adjusted under 35 U.S.C. 154(b) by 0 days.

(21) Appl. No.: 16/772,791

(22) PCT Filed: Dec. 13, 2018

(86) PCT No.: PCT/DK2018/050357
§ 371 (c)(1),
(2) Date: Jun. 14, 2020

(87) PCT Pub. No.: WO2019/114907
PCT Pub. Date: Jun. 20, 2019

(65) Prior Publication Data
US 2020/0362586 A1  Nov. 19, 2020

(30) Foreign Application Priority Data

Dec. 15, 2017  (DK) .......................... PA 2017 70947

(51) Int. Cl.
*E04H 12/18* (2006.01)
*F16B 7/10* (2006.01)
*B60Q 1/26* (2006.01)

(52) U.S. Cl.
CPC .......... *E04H 12/182* (2013.01); *E04H 12/18* (2013.01); *F16B 7/10* (2013.01); *B60Q 1/2657* (2013.01)

(58) Field of Classification Search
CPC ........ H01Q 1/1235; H01Q 1/10; F16B 7/105; F16B 7/14; F16B 7/10; E04H 12/182; E04H 12/18; E04H 12/085; B60Q 1/2657
(Continued)

(56) References Cited

U.S. PATENT DOCUMENTS 3,495,370 A   2/1970  Habra et al.
4,062,156 A * 12/1977 Roth ........................ B64G 1/22
                                                    52/111

(Continued)

FOREIGN PATENT DOCUMENTS

NL       1020345 C2    6/2003

*Primary Examiner* — Brent W Herring
(74) *Attorney, Agent, or Firm* — Dykema Gossett PLLC

(57) ABSTRACT

There is disclosed a telescopic mast including one or more telescopic members with parallel walls. One of two adjacent telescoping sections is narrower than the other of the two adjacent telescoping sections such that a telescoping section can be moved into and out of, respectively, of a surrounding telescoping section in a telescopic member. This surrounding telescoping section can be moved into and out of a further telescoping section in a further telescopic member. In the one telescoping section in a telescopic member there is provided a guide rail running in axial direction of the telescoping section. Between each of two adjacent telescoping sections in a telescopic member there is provided at least one spacer means arranged for keeping the telescoping sections apart and controlling their mutual movement. This means includes a mounting fitting fastened to the second telescoping section in a telescopic member and a flexible sleeve mounted in the mounting fitting. In the flexible sleeve is fitted a slide shoe that includes a pin for engaging the flexible sleeve, and a groove arranged for engaging the guide rail.

6 Claims, 4 Drawing Sheets

(58) Field of Classification Search
USPC .......................................... 52/111, 118, 632
See application file for complete search history.

(56) References Cited

U.S. PATENT DOCUMENTS

| | | | |
|---|---|---|---|
| 4,357,785 A | | 11/1982 | Eklund |
| 4,918,896 A | * | 4/1990 | Wiese .................... E04H 12/182 |
| | | | 52/632 |
| 5,332,266 A | * | 7/1994 | Canale .................... A47L 9/244 |
| | | | 285/24 |
| 5,540,017 A | | 7/1996 | Eilam et al. |
| 6,767,115 B2 | * | 7/2004 | Blackwelder ............. B60P 3/18 |
| | | | 362/385 |
| 7,025,383 B2 | * | 4/2006 | Canale .................... A47L 9/244 |
| | | | 285/7 |
| 8,549,812 B1 | * | 10/2013 | Peng ........................ H01Q 1/10 |
| | | | 52/843 |
| 9,371,663 B2 | * | 6/2016 | Pereira .................. E04H 12/182 |
| 9,895,040 B2 | * | 2/2018 | Canale .................... A47L 9/244 |
| 10,041,624 B2 | * | 8/2018 | Christen .................. A47B 9/20 |
| 2003/0095411 A1 | * | 5/2003 | Blackwelder ........ B60Q 1/2611 |
| | | | 362/385 |
| 2013/0239490 A1 | * | 9/2013 | Peng .................. E04B 1/34305 |
| | | | 52/111 |
| 2016/0281912 A1 | * | 9/2016 | Christen .................... F16B 7/10 |

* cited by examiner

TELESCOPIC MAST

CROSS-REFERENCE TO RELATED APPLICATIONS

This application is a national stage filing based upon International PCT Application No. PCT/DK2018/050357, filed 13 Dec. 2018, which claims the benefit of priority to Denmark application No. PA 2017 70947, filed 15 Dec. 2017.

FIELD OF THE INVENTION

The present invention concerns a telescopic mast including at least one or more telescopic members with parallel walls, where one of two adjacent telescoping sections is narrower than the other of the two adjacent telescoping sections, so that one telescoping section can be moved into and out of, respectively, of a surrounding telescoping section in a telescopic member as well as the latter can be moved into and out of a further telescopic member, where in the one telescoping section in a telescopic member there is provided a guide rail running in axial direction of the telescoping section, and where between each of two adjacent telescoping sections in a telescopic member there is provided at least one spacer means arranged for keeping the telescoping sections apart and controlling their mutual movement.

BACKGROUND OF THE INVENTION

There are many kinds of telescopic masts of which some can be extended automatically. In connection with such telescopic masts, for example for military applications, there are special requirements to practicability as well as to operability in extreme situations and weather conditions.

Telescopic masts can be very high and may be used for sensors and weapons as well as for pointing out targets. High telescopic masts contain many telescoping sections. As play occurs between all adjacent telescoping sections of the mast, the play will accumulate in connection with high masts. Therefore, not the least in connection with high telescopic masts, it will very appropriate to minimise the play appearing between adjacent telescoping sections.

There exist telescopic masts where in the gap between two adjacent telescoping sections means are provided that include actuators and/or mechanisms that may reduce play by e.g. pressing the adjacent walls away from each other. These means contribute to reducing play but are technically complicated and add an undesirable increase in weight.

It is expedient if the part elements of the telescopic mast are not heavier and larger than necessary. In order to live up to requirements for reliability and sturdy construction, it is a clear disadvantage for a telescopic mast if the technology comprises frail technical solutions wherein failures may arise, causing the telescopic mast not be operated rapidly, accurately and under all conditions.

There is also a need for a solution which in a simple way counteracts rotational movement about the longitudinal axis of the mast sections on telescopic masts with one or more extendable telescopic members.

Telescopic masts used in environments with high loads are subjected to static as well as dynamic loads. These can e.g. be caused by wind loads as well as loads arising from mobile use.

These loads can be very high G-loads that arise suddenly. They occur with random magnitudes and directions and provide a very complex load picture.

These loads can arise from the top where a payload is mounted and/or from the bottom of the telescopic mast in the case of a mobile base/platform.

The rotational control can/will be exposed to very large loads.

It is desired to counteract rotational movement about the longitudinal axis of the mast sections in telescopic masts used on mobile platforms, e.g. vehicles, and where there is a requirement or wish for minimal rotation between the sections about the central axis of the mast, as the load/payload placed on the mast may require controlling the direction as viewed from the central axis of the mast. This may be communications antennae, radars, sensors, weapons, etc.

In connection with high telescopic masts it is thus very advantageous if these are built up of simple components which irrespectively of the conditions provide a simple and uncomplicated use and operation of the telescopic mast, and which minimises play and counteracts mutual rotational movement of the telescopic sections about the longitudinal axis of the mast. None of the prior art solutions fulfill these demands.

U.S. Pat. No. 4,357,785 A discloses a telescopic mast of the kind mentioned in the introduction having a telescoping section including guide rails running in axial direction of the telescoping section and spacer means mounted on another telescoping section by means of mounting fittings and interacting with the guide rails.

OBJECT OF THE INVENTION

The object of the present invention is to provide a telescopic mast where the play between the telescoping sections is minimised. It is a further object of the invention to provide a telescopic mast that counteracts mutual rotational movement of the telescoping section, and which is light.

DESCRIPTION OF THE INVENTION

As indicated by introduction, the present invention concerns a telescopic mast including at least one or more telescopic members with parallel walls, where one of two adjacent telescoping sections is narrower than the other of the two adjacent telescoping sections, so that one telescoping section can be moved into and out of, respectively, of a surrounding telescoping section in a telescopic member as well as the latter can be moved into and out of a further telescopic member, where in the one telescoping section in a telescopic member there is provided a guide rail running in axial direction of the telescoping section, and where between each of two adjacent telescoping sections in a telescopic member there is provided at least one spacer means arranged for keeping the telescoping sections apart and controlling their mutual movement. The telescopic mast is peculiar by including a mounting fitting fastened to the second telescoping section in a telescopic member and a flexible sleeve mounted in the mounting fitting, where in the flexible sleeve there is mounted a slide shoe including a pin for engaging the flexible sleeve and a groove arranged for engaging the guide rail.

By a telescopic mast according to the invention is achieved reduction in play and rotational control with additional advantages.

The part elements can be produced with much tighter tolerances that provide minimal play.

The solution is very compact as suppression is provided by flexible and resilient material in the sleeve. The material for making the sleeve is elastically yielding such that by action of force the position of the hole and thereby the slide shoe can be changed relative to the mounting fitting under load, and that the sleeve is biased to return to its initial shape after removal of the load.

Deformations and/or movement in and between the telescoping sections of the mast increasing the loads on guide rail/slide shoe are not all to be absorbed as loads in the material but are mitigated in the flexible material The action of these complex combinations of shock-loads in multiple directions and simultaneously is not only to be absorbed as loads in/between slide shoe and slide rail, but will be absorbed and mitigated in the flexible material.

A telescopic mast according to the invention may advantageously be designed so that a pipe is provided inside the telescoping sections. Supply lines and cables of various kinds used in connection with equipment disposed at the top of the telescopic mast may be arranged in this pipe. For example, this may be antenna equipment, surveillance equipment, lamps, weapons or other equipment.

By a telescopic mast according to the invention is thus achieved a number of advantages as the spacer means that resiliently keeps the adjacent walls away from each other minimises the play occurring between adjacent telescoping sections. By pressing the adjacent walls away from each other, the play is eliminated or minimised.

Furthermore, by the telescopic mast according to the invention is achieved an advantage in that the groove of the slide shoe interacts with the guide rail, thereby preventing mutual rotational movement of the telescoping sections about the longitudinal axis of the mast. The construction, which consists of individual elements, will also be a simple and light construction.

By the design is also achieved an advantage in that impact and blow actions are absorbed in the flexible sleeve between the groove engaging the guide rail on one telescoping section and the mounting fitting that is fastened to the other telescoping section.

Spacer means of different nature with regard to design as well as material may be used. It can be advantageous to make the slide shoe and the sleeve of materials that are dimensionally stable in connection with large temperature fluctuations. It may furthermore be advantageous to apply a coating on the slide shoe, the sleeve and/or the guide rail comprising a layer of friction reducing material, as e.g. Teflon, for minimising friction between and wear of the elements involved.

According to a further embodiment, the telescopic mast according to the invention is peculiar in that the guide rail in each telescopic member is provided on an inwardly facing side of one telescoping section, and that the mounting fitting is provided on an outwardly side of the other telescoping section.

In practice, it has appeared expedient if the guide rail or rails in each telescopic member is provided on an inwardly facing side with the purpose of a simple design. The mounting fitting will hereby be placed on an outwardly facing side of the second telescoping section provided inside the first telescoping section. Alternatively, it is possible to arrange this disposition oppositely such that the guide rail in each telescopic member is provided on an outwardly facing side of the internal telescoping section in a telescopic member.

According to a further embodiment, the telescopic mast according to the invention is peculiar in that the flexible sleeve is made of a flexible material such that the slide shoe can be displaced radially or axially relative to a central axis through the mounting fitting. As the flexible sleeve is made of a flexible material allowing displacement in several dimensions, there is ensured the highest degree of absorption of shock actions, reducing wear, and at the same time is achieved rotational fixing between the different telescoping sections.

Since the slide shoe can be displaced radially as well as axially relative to a central axis through the mounting fitting, shock actions are absorbed irrespectively of the direction thereof.

According to a further embodiment, the telescopic mast according to the invention is peculiar in that the flexible sleeve is made with a mounting hole for receiving the pin of the slide shoe, and that the pin of the slide shoe can rotate in the mounting hole in the sleeve. By making the connection between the pin of the slide shoe and the hole in the sleeve without fixation, the rotation in the mounting hole will ensure that also twisting between the two telescoping sections can be absorbed in the flexible sleeve. Also, a rotation of the pin of the slide shoe will enable using guide rails that do not run completely axially but may have an inclination relative to an axial direction which is parallel with a central axis through the telescopic mast.

According to a further embodiment, the telescopic mast according to the invention is peculiar in that for each telescopic member there is provided three or more guide rails distributed along the periphery of the telescopic member. By applying several guide rails distributed along the periphery of the telescopic member, there is achieved an even distribution that absorbs the play as well as provides the rotationally fixed distribution. By the even distribution of the guide rails and thereby also of the interacting spacer means there may be established a centring of the inner telescoping section in an outer telescoping section in a telescopic member. Thus there may be a single guide rail in a telescopic member, but there may as well be two or more guide rails in a telescopic member.

According to a further embodiment, the telescopic mast according to the invention is peculiar in that for each guide rail there are provided two or more spacer means distributed in axial direction of the telescopic member. In order to distribute a load and secure an orientation against rotation two or more spacer means distributed in the telescopic member may be provided, distributed in axial direction of the telescopic member. By such an assembly torsional twisting of one telescoping section relative to the other telescoping section in a telescopic member is prevented.

DESCRIPTION OF THE DRAWING

The invention is described in more detail with reference to the drawing, wherein.

DETAILED DESCRIPTION OF EMBODIMENTS OF THE INVENTION

Figure 1:
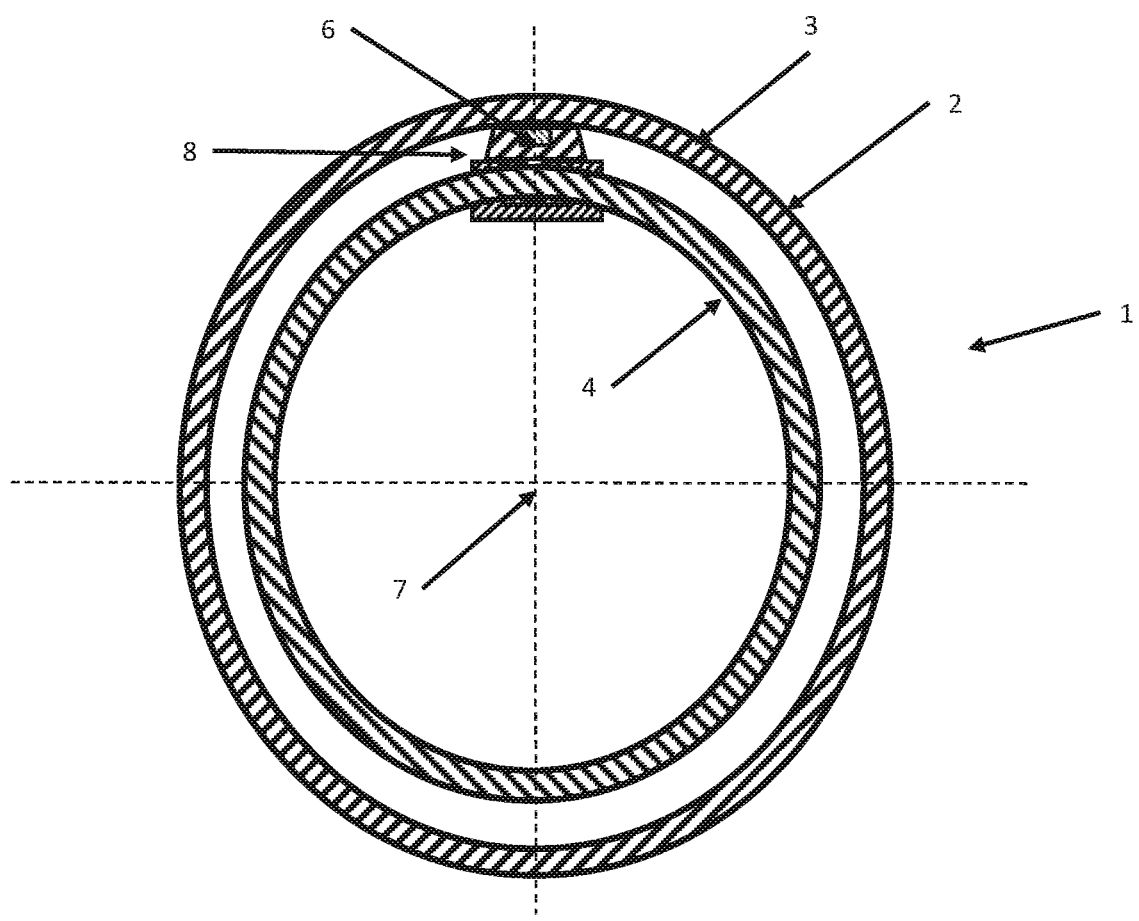
FIG. 1 shows a section through a telescopic member in telescopic mast according to the invention in which a guide rail interacts with a spacer means disposed on each their telescoping section in a telescopic member.
Figure 2:
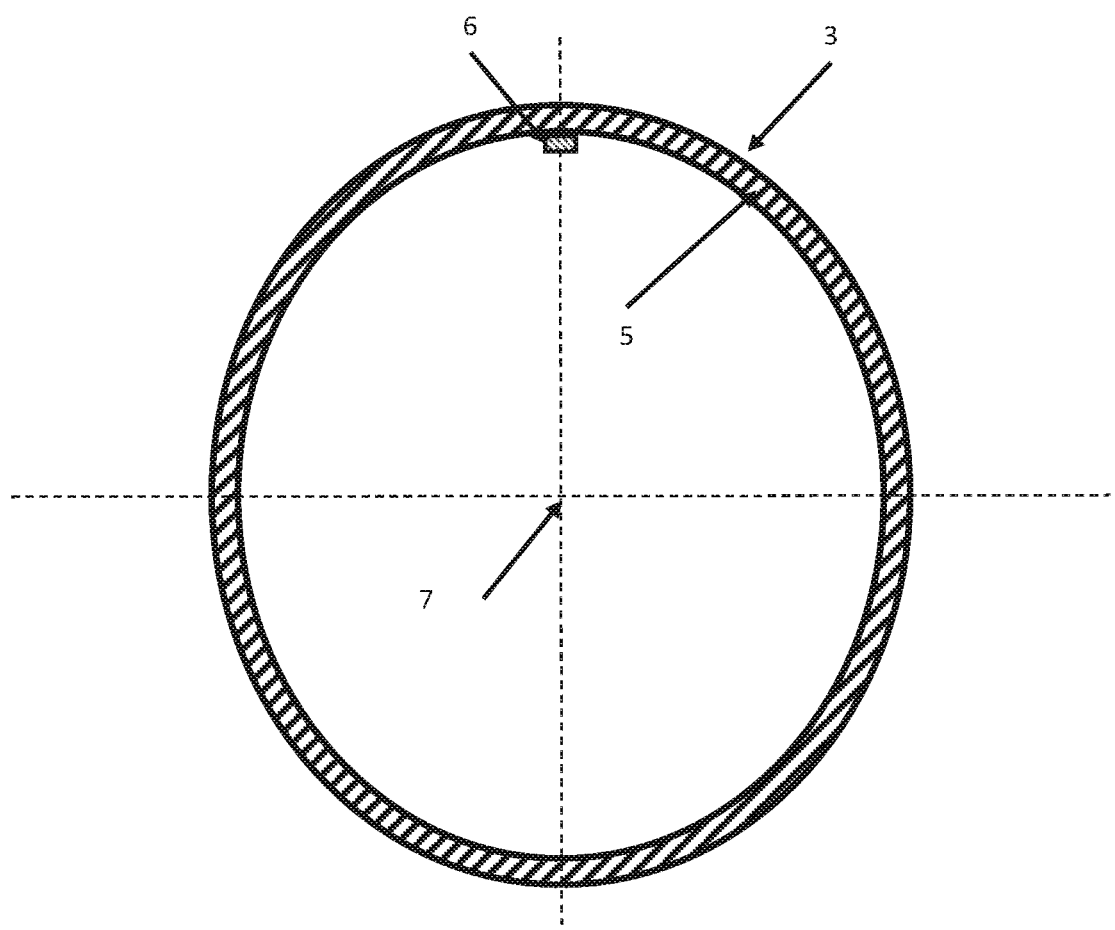
FIG. 2 shows a cross-section through one telescoping section with a guide rail running in axial direction of the telescoping section.
Figure 3:
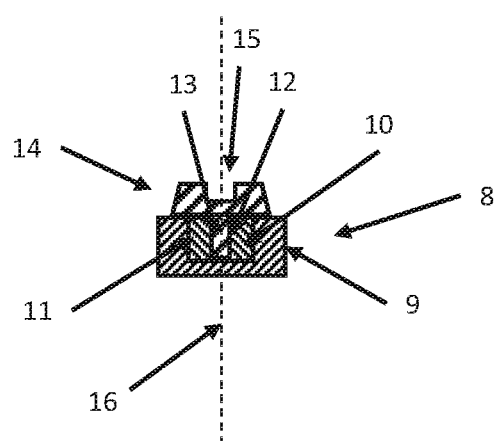
FIG. 3 shows a section through a spacer means intended for being provided on the other telescoping section in a telescopic member.

FIGS. 1-3 show various sectional views of the same design.

FIG. 1 shows a telescopic mast 1 appearing with a section through a single telescopic member 2. The telescopic member 2 comprises a first telescoping section 3 and a second telescoping section 4. The telescoping section 4 has smaller dimension than the first telescoping section 3 such that the second telescoping section 4 can be moved in over the first telescoping section 3 in the telescopic member 2. It is possible to provide a third telescoping section 17 (see FIG. 4) around the shown telescopic member, or a further telescoping section (not shown), which is disposed within the shown telescopic member 2.

In the shown embodiment, the telescoping sections 3 are designed with oval cross-section. Alternatively, the telescoping section can be provided with other cross-sectional shapes, e.g. circular.

As it appears more clearly on FIG. 2, at an inner side 5 of the first telescoping section 3 there is provided a guide rail 6. The guide rail 6 runs in axial direction in parallel with a central axis of the telescopic member 2. The central axis is indicated by 7.

FIG. 3 shows a spacer means 8, which is also shown in FIG. 1. The spacer means 8 is intended for mounting on the other telescoping section 4. The spacer means 8 comprises a mounting fitting 9 provided with an inner cavity 10. In the cavity 10 a resilient sleeve 11 is provided. The resilient, elastic sleeve 11 has a hole 12. A pin 13 from a slide shoe 14 is received in the hole 12. The slide shoe 14 includes also a groove 15 dimensioned such that it can interact with the slide rail 6. The pin 13 is mounted rotationally in the hole 12 for rotation about a central axis 16 through the mounting fitting 9.

In the shown embodiment there is only one sectional view showing a mounting means 8. However, several mounting means 8 interacting with the guide rail 6 may be provided along the length of a telescopic member 2.

Moreover, in the telescopic member 2 there may be provided several guide rails 6 that are distributed along the periphery of the one telescoping section 3. This is not shown, but the guide rails 6 will be evenly distributed along the periphery in a number that may be three or more such that a centring of the second telescoping section 4 inside the first telescoping section 3 is achieved.

Figure 4:
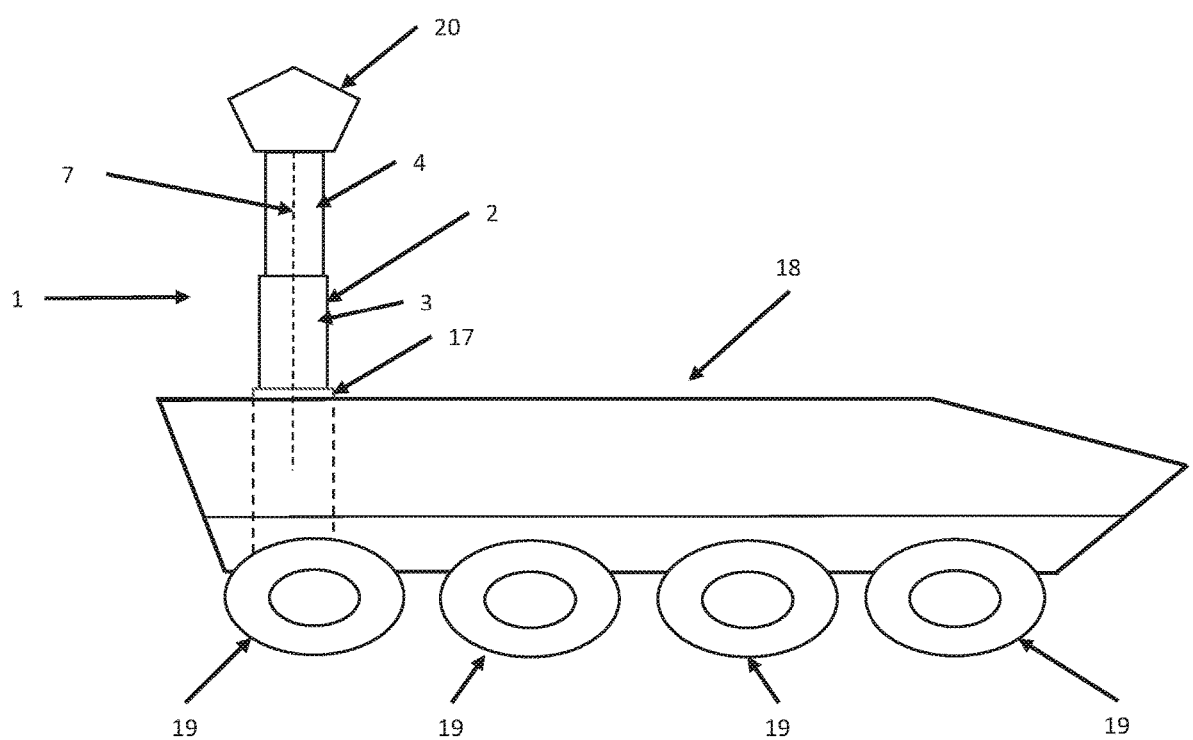
FIG. 4 shows a schematic drawing of a telescopic mast mounted on a vehicle.

FIG. 4 shows that the telescopic member 2 is disposed inside a third telescoping section 17. The telescopic mast 1 is mounted on a vehicle 18. The vehicle 18 is provided with wheels 19, but may alternatively be provided with tracks. A payload 20 is provided at the top of the telescopic mast 1.

This payload 20 may, for example, be antenna equipment, surveillance equipment, lamps, weapons or other equipment.

The invention claimed is:

1. A telescopic mast comprising:
   at least one or more telescopic members with parallel walls, and including at least a first telescoping section, a second telescoping section and a third telescoping section;
   wherein the first telescoping section is narrower than the second telescoping section, the first telescoping section configured and arranged to move into and out of the second telescoping section, and the second telescoping section configured and arranged to be moved into and out of the third telescoping section;
   the at least one or more telescopic members further including
      one or more guide rails positioned within one of the telescoping sections and running in an axial direction of the one of the telescoping sections,
      at least one spacer means arranged between each of the three telescoping sections, and configured and arranged for keeping the telescoping sections apart and controlling the respective mutual movement of the telescoping sections, the at least one spacer means comprising
         a mounting fitting fastened to the second telescoping section,
         a flexible sleeve mounted in the mounting fitting, and
         a slide shoe mounted within the flexible sleeve, the slide shoe including a pin configured and arranged for engaging the flexible sleeve and a groove arranged for engaging the guide rail.

2. The telescopic mast according to claim 1, characterised in that the guide rail in one of the three telescoping sections is provided on an inwardly facing side of the first telescoping section, and that the mounting fitting is provided on an outwardly facing side of the of the second telescoping section.

3. The telescopic mast according to claim 1, characterised in that the flexible sleeve is made of a flexible material such that the slide shoe is configured and arranged to be displaced radially or axially relative to a central axis through the mounting fitting.

4. The telescopic mast according to claim 1, characterised in that the flexible sleeve includes a mounting hole configured and arranged for receiving the pin of the slide shoe, and the pin of the slide shoe is configured and arranged to rotate in the mounting hole.

5. The telescopic mast according to claim 1, wherein the one or more guide rails are distributed along the periphery of each of the telescoping sections.

6. The telescopic mast according to claim 5, wherein the at least one spacer means includes two or more spacer means, for each of the one or more guide rails, distributed in an axial direction of the telescoping sections.

* * * * *